Feb. 7, 1961  HANS-JOACHIM M. FOERSTER  2,970,497
CHANGE SPEED GEAR, ESPECIALLY FOR MOTOR VEHICLES
Filed Oct. 14, 1957  3 Sheets-Sheet 1

INVENTOR
HANS-JOACHIM M. FÖRSTER
BY Dicke and Craig
ATTORNEYS

Feb. 7, 1961  HANS-JOACHIM M. FOERSTER  2,970,497
CHANGE SPEED GEAR, ESPECIALLY FOR MOTOR VEHICLES
Filed Oct. 14, 1957  3 Sheets-Sheet 2

INVENTOR
HANS- JOACHIM M. FÖRSTER

BY *Dicke and Craig*

ATTORNEYS

Feb. 7, 1961  HANS-JOACHIM M. FOERSTER  2,970,497
CHANGE SPEED GEAR, ESPECIALLY FOR MOTOR VEHICLES
Filed Oct. 14, 1957  3 Sheets-Sheet 3

Fig. 5

INVENTOR
Hans-Joachim M. Förster

BY Dike and Cray
ATTORNEYS

United States Patent Office 2,970,497
Patented Feb. 7, 1961

2,970,497
CHANGE SPEED GEAR, ESPECIALLY FOR MOTOR VEHICLES

Hans-Joachim M. Foerster, Stuttgart-Bad Cannstatt, Germany, assignor to Daimler-Benz Aktiengesellschaft, Stuttgart-Unterturkheim, Germany Filed Oct. 14, 1957, Ser. No. 689,822
Claims priority, application Germany Oct. 13, 1956
23 Claims. (Cl. 74—677)

The present invention relates to a change speed gear, especially for motor vehicles, and more particularly relates to such a change speed gear which includes a hydrodynamic unit and a mechanical unit operatively connected behind the hydrodynamic unit.

The present invention essentially consists of a change speed gear including a hydrodynamic unit and a mechanical unit, such as a planetary gear, connected therewith, in which the hydrodynamic unit may be by-passed under certain operating conditions.

Change speed gears or transmissions are known in the prior art which consist of a hydrodynamic torque converter and of a mechanical change speed gear connected behind the torque converter, i.e., in the output thereof. Ordinarily, in these prior art devices, a mechanical by-pass clutch is provided for the torque converter so that in one or several of the upper speeds the torque converter can be effectively disengaged and the driving force or torque can be transmitted directly to the mechanical gear.

In these prior art arrangements, the by-pass clutch is thereby arranged in the hydrodynamic part of the transmission usually on the side of the torque converter facing the drive or input shaft. As a result thereof, the clutch used for purposes of by-passing the torque converter is always operating under oil so that with a disengaged clutch particularly high losses occur in such a transmission.

The present invention has as one of its primary aims to reduce these transmission losses and to simplify the overall construction of the transmission.

According to the present invention, this is achieved therein that with a transmission consisting of a hydrodynamic unit which may be by-passed and of a mechanical unit, a hydrodynamic coupling is provided in the hydrodynamic part or section of the transmission and the mechanical clutch serving as by-passing clutch for the hydrodynamic coupling is arranged spatially separated therefrom within the housing or casing section for the mechanical transmission unit.

According to another feature in accordance with the present invention, such a transmission may be advantageously further improved by utilizing the by-pass clutch for the hydraulic coupling which clutch is located within the mechanical transmission section for simultaneously locking a gear set of the mechanical change speed gear connected behind the hydraulic coupling, i.e., with the output thereof, for example, of a planetary gear set of a planetary gear. In other words, the by-pass clutch in accordance with the present invention also serves simultaneously for shifting the transmission ratio or speed of the mechanical transmission unit.

In a preferred embodiment according to the present invention, the hydrodynamic coupling is separated from the mechanical transmission by a cover or partition wall, for example, advantageously formed as a cover for the hydrodynamic device. An oil pump connected with the driving shaft or input side of the hydrodynamic coupling may be appropriately arranged on the side of this partition wall facing the hydrodynamic coupling. The by-pass clutch is located axially between the first gear set of the mechanical transmission unit, for example, between a planetary gear set and the aforementioned partition wall or cover. The by-pass clutch is thereby appropriately arranged also radially within a brake coordinated to the first gear set, for example, coordinated to the planet gear set of the mechanical transmission unit.

The change speed gear in accordance with the present invention offers the advantage that by the use of a hydrodynamic coupling the mechanical by-pass clutch may be located and constructionally combined with the mechanical transmission unit so that all clutches in the mechanical transmission may be composed of the same constructional elements. The by-pass clutch may thereby at the same time fulfill another function in that it is utilized for purposes of locking one of the transmission gear sets. The entire transmission losses are thereby considerably reduced because the by-pass clutch no longer operates in oil.

Accordingly, it is an object of the present invention to provide a change-speed gear including a hydrodynamic unit and mechanical unit as well as a by-pass clutch for the hydrodynamic unit in which the losses during operation thereof are minimized.

It is another object of the present invention to provide a change speed gear including a hydrodynamic unit and a mechanical transmission unit which is simple and compact in construction, which may be readily assembled and disassembled and in which the number of different parts is reduced, especially insofar as the mechanical clutches are concerned which may all be identical.

A still further object of the present invention resides in the provision of a by-pass clutch for a change speed gear including a hydrodynamic device and a mechanical unit connected in the output of the hydrodynamic device in which the by-pass clutch is operative to by-pass the hydrodynamic device yet is located in a section of the transmission separated from the hydrodynamic unit so as to avoid operation of the by-pass clutch under oil as is ordinarily the case where the by-pass clutch is located in the transmission section housing the hydrodynamic device.

A still further object of the present invention resides in the provision of a by-pass clutch for the hydrodynamic device of a change speed gear including additionally a mechanical change speed gear unit in which the losses in the by-pass clutch are reduced to a minimum or are avoided altogether when the clutch is disengaged.

A still further object of the present invention resides in the provision of a by-pass clutch for a hydrodynamic device of a transmission for motor vehicles which also includes a mechanical transmission unit in which the by-pass clutch is arranged within the section or part of the transmission casing accommodating the mechanical transmission unit and in which the by-pass clutch simultaneously serves for purposes of shifting from one speed to another in the mechanical change speed gear unit.

These and other objects, features and advantages of the present invention will become more obvious from the following description when taken in connection with the accompanying drawing, which shows, for purposes of illustration only, several embodiments in accordance with the present invention, and wherein:

Figure 1:
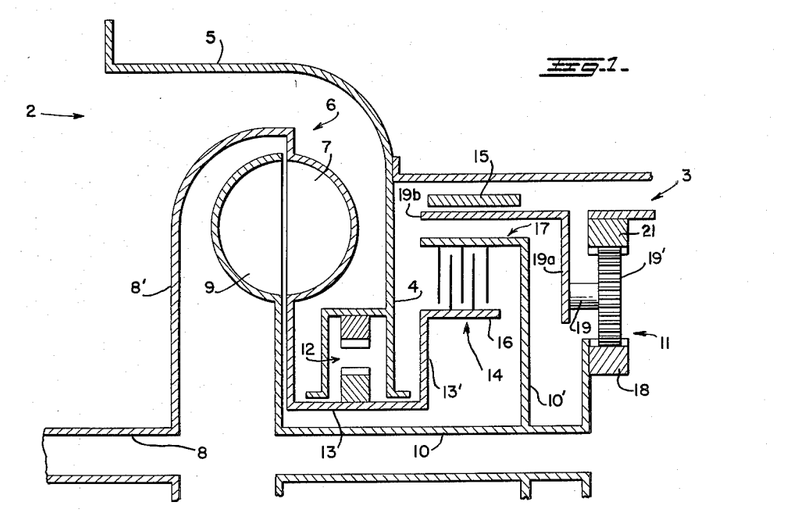
Figure 1 is a schematic illustration of a first embodiment of the input portion of a change speed transmission in accordance with the present invention including a hydrodynamic unit and a mechanical change speed gear unit.

Referring now to the drawing, wherein like reference numerals are used throughout the various views to designate like parts, and more particularly to Figure 1, reference numeral 2 generally designates the hydrodynamic section or unit and reference numeral 3 the mechanical section or unit of the change speed transmission. The hydrodynamic section 2 and the mechanical section 3 are subdivided by a cover or partition wall 4 of the relatively stationary housing 5.

The hydrodynamic device, namely, a hydrodynamic coupling, generally designated by reference numeral 6 is located within the hydrodynamic section 2 and includes a driving or impeller member 7 and a driven rotor or turbine member 9. The driving member 7 is operatively connected with the drive shaft 8 which, for example, may be connected with the crankshaft of the engine. The connection between the drive shaft 8 and the driving member 7 may thereby be made in any appropriate conventional manner, for example, by a flange member 8' simultaneously forming a part of the rotatable casing of the hydrodynamic device. The turbine or driven member 9 is connected with an intermediate shaft 10, which in turn is operatively connected with one of the elements of the first gear set generally designated by reference numeral 11 of the mechanical change speed gear or transmission connected behind the hydrodynamic device 6, i.e., connected to the normal output 9, 10 of the hydrodynamic coupling 6.

An oil pump 12, which is driven by the driving member 7 and therewith by the drive shaft 8 over an intermediate shaft portion 13, is provided at the wall or cover 4 of the transmission housing 5 on the side thereof facing the hydrodynamic device 6. The oil pump 12 thereby produces oil under pressure in response to the rotational speed of the drive shaft 8, i.e., in response to the rotational speed of the engine, as is conventional in connection with automatic transmissions.

The by-pass clutch 14 for the hydrodynamic device 6 is located physically within the part of the transmission housing also accommodating the mechanical change speed transmission, i.e., between the wall or cover 4 and the first transmission gear set 11. Thus, the by-pass clutch 14 is located in a section of the transmission housing 5 which is completely separated from the section thereof accommodating the hydrodynamic device by the wall or cover 4.

The first gear set may be of any suitable construction, for example, may be a planetary gear including a sun gear 18 driven by the turbine or driven member 9 of the hydrodynamic coupling 6 over the intermediate shaft 10, a ring gear 21 and one or a plurality of planetary gears 19' in meshing engagement with the sun gear 18 and the ring gear 21. The planet gear or gears 19' are thereby carried on a planet carrier 19 which includes a flange portion 19a terminating in a hub portion 19b for purposes of cooperation with a brake member 15 of suitable construction. The hub portion 19b of the planet carrier 19 thereby constitutes a brake drum for the brake member 15 which may be formed, for example, by a brake band of suitable brake material.

The by-pass clutch generally designated by reference numeral 14 is thereby advantageously arranged radially within the brake formed by the brake member 15 and coordinated hub portion 19b of the planet carrier 19, brake member 15 being thus coordinated with the first planetary gear set 11 to obtain a desired transmission ratio as will be explained more fully hereinafter.

The by-pass clutch 14 is preferably constructed as a friction disk clutch which is normally disengaged, for example, by a suitable spring and which may be automatically engaged by oil pressure as is well known with such types of clutches. The friction disk clutch 14 includes two support members 16 and 17 for the friction clutch disks thereof. The friction disk support member 16 is thereby connected with the intermediate shaft 13 by means of the extended flange portion 13' thereof, the intermediate shaft 13 also driving the oil pump 12 and being rigidly connected with the driving member or impeller 7 of the hydrodynamic coupling 6. The friction-disk support member 17 is connected with the intermediate shaft 10 over a flange portion 10' thereof suitably connected, for example, by splining, with the intermediate shaft 10, which itself connects the driven or rotor member 9 of the hydrodynamic coupling 6 with the sun gear 18. Thus, the by-pass clutch 14 connects the driving member 7 with the driven member 9 of the hydrodynamic device directly ahead of the input into the mechanical change speed transmission so that in all of the subsequent mechanical speeds the drive or transmission of torque may take place either over the hydrodynamic coupling 6 or also directly through the by-pass clutch 14.

Operation

The operation of the transmission in accordance with Figure 1 is as follows:

If the by-pass clutch 14 is disengaged, for example, during starting or in the lower speeds, then the drive or transmission of torque takes place through the hydrodynamic coupling 6 from the driving member 7 to the driven member 9 thereof and from there over the intermediate shaft 10 to the sun gear 18 of the first planetary gear set 11 whereby sun gear 18 now is operative as the driving or input member for the mechanical transmission unit.

If now in an upper speed the by-pass clutch 14 is engaged, then the slippage in the hydrodynamic coupling 6 is eliminated because the drive or transmission of torque takes place directly from the driving or impeller member 7 over the intermediate shaft 13, flange portion 13', the engaged clutch 14 and flange portion 10' to the sun gear 18 of the first mechanical gear set. In other words, with the by-pass clutch 14 engaged, the intermediate shaft 13, the flange portion 13' thereof, as well as the intermediate shaft 10 with its flange portion 10' thereof all rotate at the speed of the driving member 7 and therewith at the speed of the drive shaft 8. Consequently, the input member of the mechanical transmission unit constituted by the sun gear 18 is now driven at the speed of the drive shaft 8.

The clutch 14 may be engaged either at will or automatically in such a manner that it is engaged only, for example, in one or two of the higher speeds of the transmission. In that manner, unobjectionable starting conditions in the lower speeds and favorable degrees of efficiency in the upper speeds may be attained. However, it is also possible that actuation of the by-pass clutch 14 may be so arranged and controlled that it may be engaged with each and every speed of the mechanical change speed transmission unit so that the drive or transmission of torque may take place in each speed, as desired, either directly or over the hydrodynamic coupling 6. Of course, the number of speeds with which the bypass clutch 14 may be engaged, either at will or automatically, may be varied to suit the particular requirements of the transmission, depending on the actual number of speeds attainable with the mechanical transmission unit. Thus, the by-pass clutch may be so controlled as to be actuated, either selectively or automatically, with only the highest speed, with all the speeds or any intervening numbers of speeds attainable with the mechanical change speed transmission. Ordinarily, however, it is desirable to provide a control for the actuation of the by-pass clutch at least in the higher speeds to thereby increase the transmission efficiency in such speeds.

Figure 2:
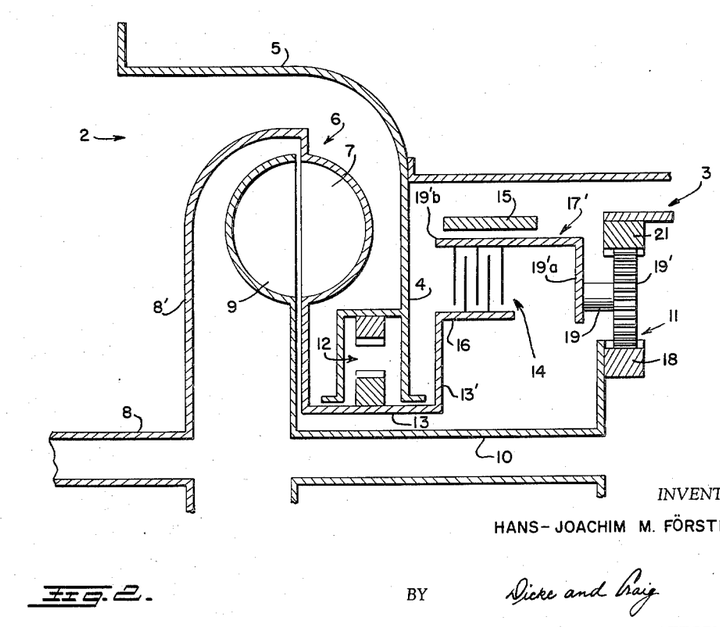
Figure 2 is a schematic view of the input portion of a modified embodiment of a change speed transmission in accordance with the present invention including a hydrodynamic unit and a change speed gear unit.

Figure 2 shows a change speed gear provided with a transmission input portion completely identical with that of Figure 1 insofar as the hydrodynamic unit thereof is concerned. The drive shaft 8 again drives the driving member 7 of the hydrodynamic coupling 6 while the input element of the first gear set 11, for example, the sun gear 18 of the planetary gear 11 is again drivingly connected with the driven or rotor member 9 of the hydrodynamic or fluid coupling 6 over intermediate shaft 10. The oil pump 12 again is drivingly connected with the driving member 7 over intermediate shaft 13 and is again located along the side of the wall or cover 4 facing the hydrodynamic part 2. The by-pass clutch 14 is again spatially located at the same place as in Figure 1, namely, to the right of wall or cover 4 and more particularly intermediate the cover or wall 4 and the first transmission gear set 11.

The by-pass clutch 14 which again may be of the friction-disk clutch type, includes again a friction-disk support member 16 drivingly connected with the intermediate shaft 13 over flange portion 13' and therewith with the driving member 7. However, the by-pass clutch 14 in the embodiment according to Figure 2 is not adapted to connect the driving member 7 with the intermediate shaft 10 as in Figure 1 but instead, upon engagement thereof, connects the driving member 7 of the hydrodynamic coupling 6 with one of the normally non-driven elements of the first planetary gear set 11, i.e., with any of the elements thereof except the sun gear 18 which is considered the normal input or driven member of the gear set 11. More particularly, the by-pass clutch 14 connects the driving member 7 of the hydrodynamic device 6 with that one of the non-driven elements of the gear set 11 which serves simultaneously as output member to transfer the torque to the next change speed transmission step.

If it is assumed in the embodiment of Figure 2 that the planet carrier 19 which supports thereon one of several planet gears 19' in meshing engagement with sun gear 18 and ring gear 21 serves to transmit the torque to the next change speed transmission step, then the by-pass clutch 14 preferably connects the driving member 7 of the hydrodynamic device 6 with the planet carrier 19 of the first gear set 11. For that purpose, the other friction disk support member generally designated by reference numeral 17' and which corresponds to the friction disk support member 17 of Figure 1 is actually formed directly by the hub portion 19'b connected with the planet carrier 19 over the flange portion 19'a. Thus, the hub portion 19'b of the planet carrier 19 simultaneously serves as friction disk support member for the friction disks of by-pass clutch 14 as well as brake drum for the brake member 15. In that manner, the by-pass clutch 14 simultaneously serves for purposes of locking the first transmission gear set 11 in itself. The term "locking" is used thereby in its broad sense since the planetary gear 11 is not locked in itself, strictly speaking, as ordinarily understood with a narrow interpretation of this term which contemplates that two of the three transmission elements of a planetary gear are connected with each other to be rotatable in unison. Instead, the term "locking" is believed appropriate in its broad terminology since the planet carrier 19 simultaneously serves as input member for the gear set 11 as well as for the output thereof upon engagement of by-pass clutch 14, as mentioned hereinabove, it being assumed that the torque is transferred to the next transmission step from the planet carrier 19. It is quite obvious that if the input and output of a planetary gear set are taken from the same element, such planetary gear effectively provides a 1:1 transmission ratio between the input and output thereof.

In the arrangement according to Figure 2, the drive or transmission of torque in all those speeds in which the first transmission gear set 11 is locked can therefore take place only directly, i.e., with the by-pass clutch 14 engaged and with the hydrodynamic device rendered ineffective or by-passed, whereas the drive or transmission or torque in all other speeds can only take place over the hydrodynamic device 6 whenever the by-pass clutch 14 is disengaged.

In the embodiment of Figure 2, the brake member 15 serves for purposes of advantageously obtaining a reverse speed in which case the hub portion 19'b simultaneously constituting the friction disk support member is held stationary whereby, of course, the transmission of torque must take place over the ring gear 21, in the reverse direction of rotation, over a suitable connection, not further illustrated in Figure 2.

Figure 3:
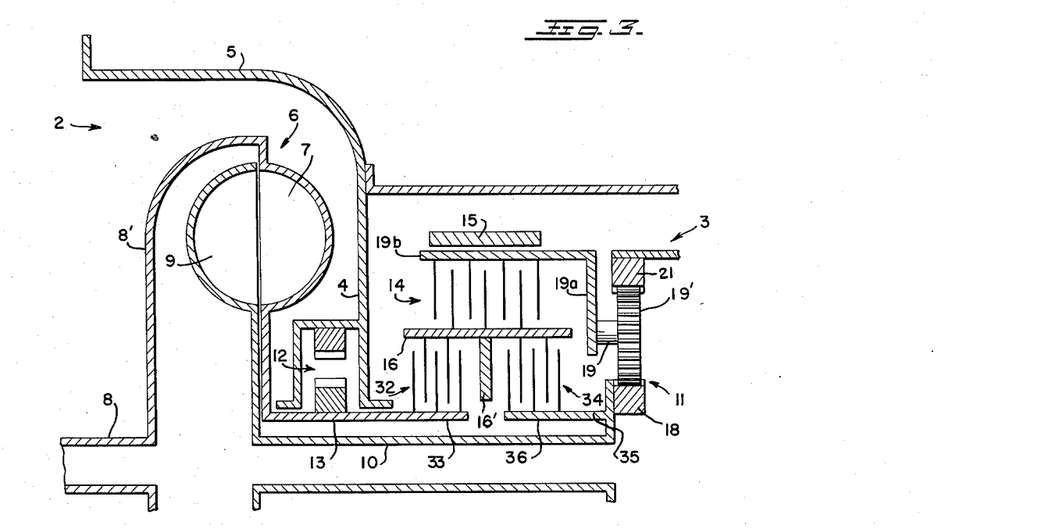
Figure 3 is a schematic view of the input portion of still another embodiment of a change speed transmission in accordance with the present invention including a hydrodynamic unit and a change speed gear unit.

If it is desired to provide in connection with the embodiment of Figure 2 the possibility that the drive or transmission of torque may also take place in all speeds over the hydrodynamic coupling 6, then it is only necessary to connect the friction-disk support member 16 with the sun gear 18, as illustrated in Figure 3. Preferably, such connection is established over a further clutch generally designated by reference numeral 34, for example, a friction disk clutch, of which the friction disks are supported by friction disk support member 16 and friction disk support member 36 which in turn is connected with the sun gear 18 over the auxiliary hub and flange connection generally designated by reference numeral 35. Additionally, a clutch generally designated by reference numeral 32 may be provided between the intermediate shaft 13 and the friction disk support member 16. The clutch 32 again may be a friction-disk type clutch of which the friction disks are supported on friction disk support member 16 and friction disk support member 33, respectively, the latter being suitably connected with the intermediate shaft 13. The support member 16 may thereby be provided with an inwardly projecting annularly shaped flange portion 16' to separate the two clutches 32 and 34 from one another. The various parts of the clutches 32 and 34 may again be constructed interchangeably with each other, as well as interchangeably with the by-pass clutch 14, especially insofar as the friction disks are concerned.

*Operation*

The operation of the embodiment according to Figure 2 is as follows: As long as the by-pass clutch 14 is disengaged, the drive or transmission of torque takes place from drive shaft 8 through the hydrodynamic coupling 6 over driving member 7 and driven member 9 thereof, intermediate shaft 10, and sun gear 18, the latter thereby constituting the input element of the gear set 11. The output from the gear set 11 to the next transmission part or step effecting a further change in the transmission ratio may thereby take place either from the planet carrier 19 or the ring gear 21. If the ring gear 21 is held stationary, then the output from the planet carrier 19 takes place at a reduced transmission ratio. On the other hand, if the planet carrier 19 is held stationary by brake 15, then the output takes place over ring gear 21 in the reverse direction. However, at no time can the output from the gear set 11 be at a 1:1 ratio with respect to the input thereof if the drive is to take place through the fluid coupling 6 unless an additional separate clutch is provided locking any two of the gear set elements 11 together, as is well known.

As soon as the bypass clutch 14 is engaged, an essentially 1:1 transmission ratio is obtained, if the output from the gear set 11 is taken from the planet carrier 19. The sun gear 18 will thereby rotate at essentially the same speed due to the interaction in the hydrodynamic coupling 6 and by reason of the fact that the sun gear 18 is no longer operative as input member. Consequently, the ring gear 21 will also rotate at the same speed as the planet carrier 19, thereby effectively locking the planetary gear 11. Consequently, in all speeds in which the first gear set 11 must provide a 1:1 transmission ratio, such transmission can only take place directly over the intermediate shaft 13 in by-passing relationship with the hydrodynamic device 16. This is desirable since the 1:1 ratio of the planetary gear set 11 is used for purposes of the higher speeds in which elimination of the losses of the hydrodynamic device 6 are desirable.

If greater versatility for the embodiment of Figure 2 is desired, an additional clutch may be provided locking any two elements of the planetary gear 11 with each other, and/or a disengageable connection may be provided between friction disk support member 16 and sun gear 18, as has been described in connection with Figure 3.

*Operation*

The operation of the device according to Figure 3 is essentially similar to that of Figure 2 with the clutch 32 thereof engaged and the clutch 34 thereof disengaged, and with clutch 14 either engaged or disengaged.

With the clutch 32 either engaged or disengaged, and by-pass clutch 14 and clutch 34 disengaged, the sun gear 18 constitutes the input element of the first gear set 11 and is driven through the hydrodynamic coupling 6 from the driven member 9 thereof. As soon as by-pass clutch 14 is engaged in addition to engagement of clutch 32 which may be engaged simultaneously therewith, prior or subsequent to engagement of clutch 14, the planet carrier 19 is driven at the same speed as the driving member 7 and therewith as the drive shaft 8 of the transmission. Consequently, the planet carrier 19 becomes the input element as well as the output element of the first gear set as described hereinabove in connection with Figure 2 whereby a 1:1 transmission ratio is obtained.

Thus again, with engagement of clutches 32 and 14, any speed or transmission ratio effected by the other gear sets must take place directly from the drive shaft 8 in by-passing relationship with respect to the hydrodynamic coupling 6, i.e., at a 1:1 ratio in gear set 11.

If it is desired to obtain also a drive through the hydrodynamic coupling 6 in all speeds, it is only necessary to disengage the clutch 32. As a result thereof, the sun gear 18 again becomes the input element of the gear set 11, which is thereby driven over the hydrodynamic device 6 from the driven member 9 thereof. Of course, this is the same operating condition as obtained with engagement of clutch 32 and disengagement of clutches 14 and 34. However, with clutch 32 disengaged, clutches 34 and 14 may now be used as lock-up clutch to produce a 1:1 ratio in gear set 11 though the drive takes place through the coupling 6.

Thus, if a drive through the hydrodynamic device is also desirable for those speeds in which the first gear set 11 must produce a 1:1 ratio, it is only necessary to disengage the clutch 32 and engage clutch 34 as well as by-pass clutch 14, which in effect locks up the planetary gear 11 to produce a 1:1 ratio while still being driven through the hydrodynamic coupling 6 over the driven member 9 thereof.

Thus, it is seen that the arrangement of Figure 3 enables a transmission of torque through the hydrodynamic device 6 in all speeds obtainable with the mechanical change speed transmission even in those speeds which require a lockup of the first gear set 11.

In addition thereto, upon simultaneous engagement of both clutches 32 and 34 while clutch 14 is disengaged, the drive or transmission of torque may take place directly from the drive shaft 8 in by-passing relationship with the hydrodynamic device 6 at all speeds of the mechanical change speed gear, including that obtainable with a 1:1 ratio of the first gear set 11 which is obtained by the additional engagement of clutch 14, simultaneously with the engagement of clutches 32 and 34.

The control arrangement for the arrangement of Figure 3 may be obtained in any suitable manner, either selectively, at will, or semi-automatically or fully automatically in response to the torque and/or speed of the engine and/or vehicle. Furthermore, a conventional control arrangement may be provided which empties or partially empties the hydrodynamic device 6 of the hydraulic fluid when both clutches 32 and 34 are simultaneously engaged since under those conditions the hydrodynamic device is not needed in the operation of the transmission.

Figure 4:
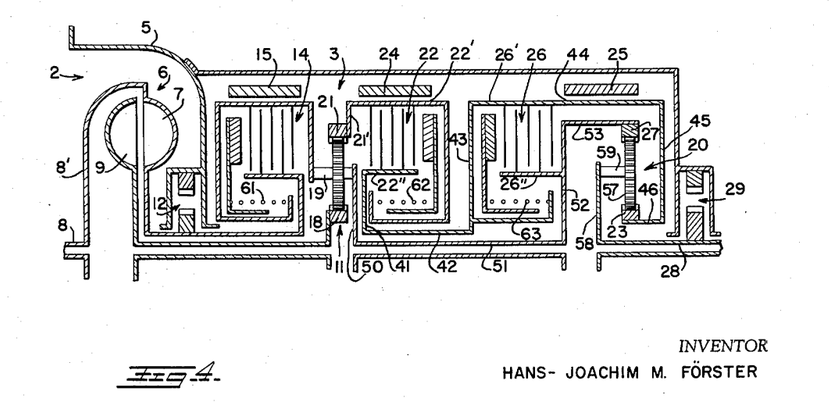
Figure 4 is a schematic view of the overall construction of a preferred embodiment of a change speed transmission including a hydrodynamic unit and mechanical unit in accordance with the present invention.

Figure 4 illustrates schematically the overall construction of a transmission in accordance with the present invention which includes the input portion according to Figure 2 provided with a hydrodynamic coupling 6 which is followed by a two-step planetary change speed gear operatively connected therewith and consisting of the first planetary gear set generally designated by reference numeral 11 and by the second planetary gear set generally designated by reference numeral 20.

The non-driven ring gear 21 of the first planetary gear set 11 is connected over the disengageable clutch 22 with the sun gear 23 of the second planetary gear set 20. The connection between the ring gear 21 of the first planetary gear set 11 and the sun gear 23 of the second planetary gear set 20 thereby takes place over the friction disk support member 22' suitably connected with the ring gear 21 by means of a flange or annular disk 21'. A radially inwardly disposed complementary friction-disk support member 22" is connected with a flange portion 41 which in turn is suitably connected with the intermediate shaft 42. The intermediate shaft 42 in turn is connected with a flange portion 43 which in turn is connected with a hub portion 44 simultaneously forming a brake drum for the brake member 25. The flange portion 45 connects the hub portion 44 with the sleeve or hub portion 46 which may be suitably connected or formed integral with the sun gear 23. The brake members 24 and 25 serve to brake the ring gear 21 and sun gear 23, respectively upon disengagement of the clutch 22. The clutch 26 includes a friction disk support member 26' constituted, for example, by the hub member 44 or suitably connected therewith and a complementary friction-disk support member 26" for supporting thereon the interdigitated friction disks of the clutch 26. The friction disk support member 26" is connected with the ring gear 27 of the second planetary gear set 20 by means of flange portion 52 and sleeve or hub portion 53 which may be formed integrally with the ring gear 27 or suitably connected therewith. The clutch 26 serves for purposes of locking the second planetary gear set 20 in itself upon engagement thereof since it connects the sun gear 23 with the ring gear 27 thereof.

Furthermore, the ring gear 27 of the second planetary gear set 20 is also rigidly connected with the planet carrier 19 of the first planet gear set 11 over the sleeve portion 53, the flange portion 52, the intermediate shaft 51 and the flange portion 50. The output shaft 28 of the transmission is connected with the planet carrier 59 of the secondary planetary gear set 20 over flange portion 58, planet carrier 59 supporting thereon one or several planet gears 57, which are in meshing engagement with the sun gear 23 and ring gear 27 of the second planetary gear set. The oil pump 29, which is disposed within the or at the output side of the transmission casing 5 is thereby driven by the output or driven shaft 28. The oil pump 29 constitutes a secondary oil pump. Springs 61, 62 and 63 maintain clutches 14, 22 and 26, respectively, normally disengaged so that the hydraulic actuation thereof must overcome the respective spring forces for engagement thereof.

Operation

The transmission illustrated in Figure 4 provides a transmission with four forward speeds and a reverse speed. These various speeds are selectively engaged by the selective engagement of clutches 14, 22 and 26 and brake members 15, 24 and 25. More particularly, the various speeds are obtained as follows:

First speed

The first or lowest speed of the transmission illustrated in Figure 4 is obtained by engagement of brake 24 and engagement of brake 25 while all clutches 14, 22 and 26 as well as brake member 15 are disengaged. As a result thereof, the drive or transmission of torque takes place in the lowest speed from the drive shaft 8 to output shaft 28 over the hydrodynamic device 6, the first planetary gear set 11 which produces a speed reduction by reason of the fact that the ring gear 21 is held stationary and planet gears 19' driven by sun gear 18 roll off along ring gear 21. The drive then is transmitted from planet carrier 19 over intermediate shaft 51 and ring gear 27 of the second planetary gear set 20 which also produces a speed reduction by reason of the fact that the sun gear 23 thereof is held stationary by the engaged brake member 25. Thus, the first speed operates at a transmission ratio determined by the slippage in the hydrodynamic coupling 6 as well as by the speed reduction in the first planetary gear set 11 and the speed reduction in the second planetary gear set 20.

Second speed

In the second speed, the brake 24 remains engaged while the brake 25 is disengaged whereupon the clutch 26 is engaged. Clutches 14 and 22 as well as brake 15 remain disengaged. The drive or transmission of torque from drive shaft 8 to output shaft 28 again takes place over the hydrodynamic device 6, the first gear set 11 which still produces the same speed reduction as before by reason of the continued engagement of brake member 24, and from there over the second planetary gear set 20 which now produces a 1:1 transmission ratio by reason of the fact that clutch 26 locks the planetary gear in itself.

It is thus seen that the second speed also takes place over the hydrodynamic coupling 6 and its transmission ratio is determined by the slippage occurring within the hydrodynamic coupling 6 as well as by the speed reduction which occurs in the first planetary gear 11.

Third speed

In order to obtain third speed, the brake member 24 is disengaged whereupon the by-pass clutch 14 is engaged. Engagement of the by-pass clutch 14 effectively lock up the first planetary gear set 11 to provide a 1:1 transmission ratio thereby. In order to obtain third speed, it is further necessary to disengage clutch 26 and to thereupon engage brake member 25 so as to produce a speed reduction in the second planetary gear set 20, clutch 22 as well as brake members 15 and 24 remaining disengaged. The disengagement of the clutch 26 may thereby take place at any predetermined time prior or subsequent thereto, preferably at or near the time in the shifting operation as the disengagement of the brake member 24, while the engagement of brake member 25 may take place at or near the same time as the engagement of clutch 14.

It is thus seen that in third speed, the drive takes place from the drive shaft over the intermediate shaft 13 and by-pass clutch 14 in by-passing relationship with respect to the hydrodynamic coupling 6, through the first planetary gear set 11 of which the planet carrier 19 simultaneously constitutes the input and output element, and through the second planetary gear set 20 which now produces a speed reduction, whereby the various elements of the planetary gear sets 11 and 20 are so selected that the speed reduction in planetary gear 20 is less than that obtained in the planetary gear 11.

Fourth speed

In order to obtain fourth speed, it is only necessary to disengage brake member 25 and to thereupon engage clutch 22, thereby driving the sun gear 23 and ring gear 27 of the second planetary gear set at the same rotational speed and effectively locking the second planetary gear set 20 in itself. In the alternative, it is quite obvious that instead of engaging the clutch 22 the clutch 26 may also be engaged after the brake member 25 is disengaged to obtain fourth speed. This produces the same result since engagement of clutch 26 also locks up the second planetary gear set 20 even though clutch 22 is disengaged.

However, it is also possible to provide a control arrangement whereby both clutches 22 and 26 will be engaged for purposes of engagement of the fourth speed. Such engagement may take place essentially simultaneously or in predetermined succession, either with partial or complete initial engagement of one or the other of the two clutches 22 or 26 before the other is also engaged.

The fourth speed which is a direct speed takes place directly from drive shaft 8 over intermediate shaft 13, the by-pass clutch 14, the first planetary gear set 11 which again operates with the planet carrier 19 thereof constituting the input as well as output element or at least partial output element if clutch 22 is engaged, and over the second planetary gear set 20 which is now also locked in itself. Consequently, a 1:1 transmission ratio directly connecting the drive shaft 8 with the output shaft 28 takes place in fourth speed.

Reverse speed

In order to obtain the reverse speed, clutches 14 and 26 are disengaged while clutch 22 is engaged. At the same time, brakes 24 and 25 are disengaged and brake member 15 is engaged.

The drive in reverse thereby takes place from drive shaft 8 over the hydrodynamic coupling 6, the first planetary gear set 11 which now produces a reverse drive by braking of the planet carrier 19 thereof, the ring gear 21 now constituting the output element of the first planetary gear set 11, the clutch 22, and the second planetary gear set 20 of which the ring gear is now held stationary since the latter is directly connected with the braked planet carrier 19 over the intermediate shaft 51.

The reverse speed thereby takes place at a speed reduction determined by the speed reduction produced by the first planetary gear set 11 and by the second planetary gear set 20 as well as by the slippage occurring in the hydrodynamic coupling 6.

It is thus seen that the transmission according to Figure 4 has two upper speeds, namely third and fourth speeds, in which the drive or transmission of torque only takes place directly to the second planetary gear set 20 in by-passing relationship with respect to the hydrodynamic coupling 6 and with simultaneous lock of the first planetary gear set 11. Fourth speed is thereby obtained by engaging the clutch 26 to produce a locking of the planetary gear set 20 and therewith a direct drive, while engagement of the brake 25 is used to produce a speed reduction in the planetary gear set 20 to provide third speed.

It is also seen that the transmission in accordance with this embodiment has two lower speeds, namely first and second speeds, in which the drive or transmission of torque takes place only through the hydrodynamic coupling 6 so that in both the first and second speed the sun gear 18 of the first planetary gear set always constitutes the input element thereof. In both the first and second speeds, the first planetary gear set provides a speed reduction by reason of the engagement of brake member 24.

Reverse speed is also obtained by providing a speed reduction in the first planetary gear set 11 as well as in the second planetary gear set 20.

Thus, the transmission illustrated in Figure 4 combines in an advantageous manner all requirements and expectations of a transmission, namely, an unobjectionable starting condition with a favorable efficiency in the upper speeds.

It is understood that Figure 4 may be actually constructed in any appropriate manner, for example, by forming the parts 21', 50, 51, 52, 53, 58, 59, 44, 45, 46, and 43 as well as the parts 13' integral with parts with which they are operatively connected or separate therefrom, the connection therebetween being established in a suitable manner, for example, by a splined arrangement.

Moreover, all clutches and brake members may be controlled either at will or automatically in any suitable manner, for example, mechanically, electrically or preferably hydraulically. The automatic hydraulic control arrangement may thereby utilize the oil pump 12 and oil pump 29 which produce oil under pressure as a function of the engine speed and output speed of the transmission, the latter being proportional to the speed of the vehicle. The output of each of these two pumps 12 and 29 may thereby be used to automatically shift from one speed to another in any suitable conventional manner, by actuating suitably constructed spool valves controlling the energization of the various elements 14, 15, 22, 24, 25, and 26. The setting of the accelerator pedal and/or the engine torque as determined, for example, by the vacuum in the intake manifold or the setting of the adjusting rack of the fuel injection pump may also be used to control the automatic shifting operation.

In the alternative, the various speeds may be preselected by means of any suitable preselection means, such as a gear shift lever, push buttons or the like so as to selectively engage all the particular elements necessary to produce the particular desired speed, corresponding to the preselection.

Furthermore, the hydrodynamic device may be controlled by being emptied to any desired degree and in any suitable manner, preferably automatically, when the transmission is in third or fourth speed since in those speeds the hydrodynamic device is by-passed.

Figure 5:
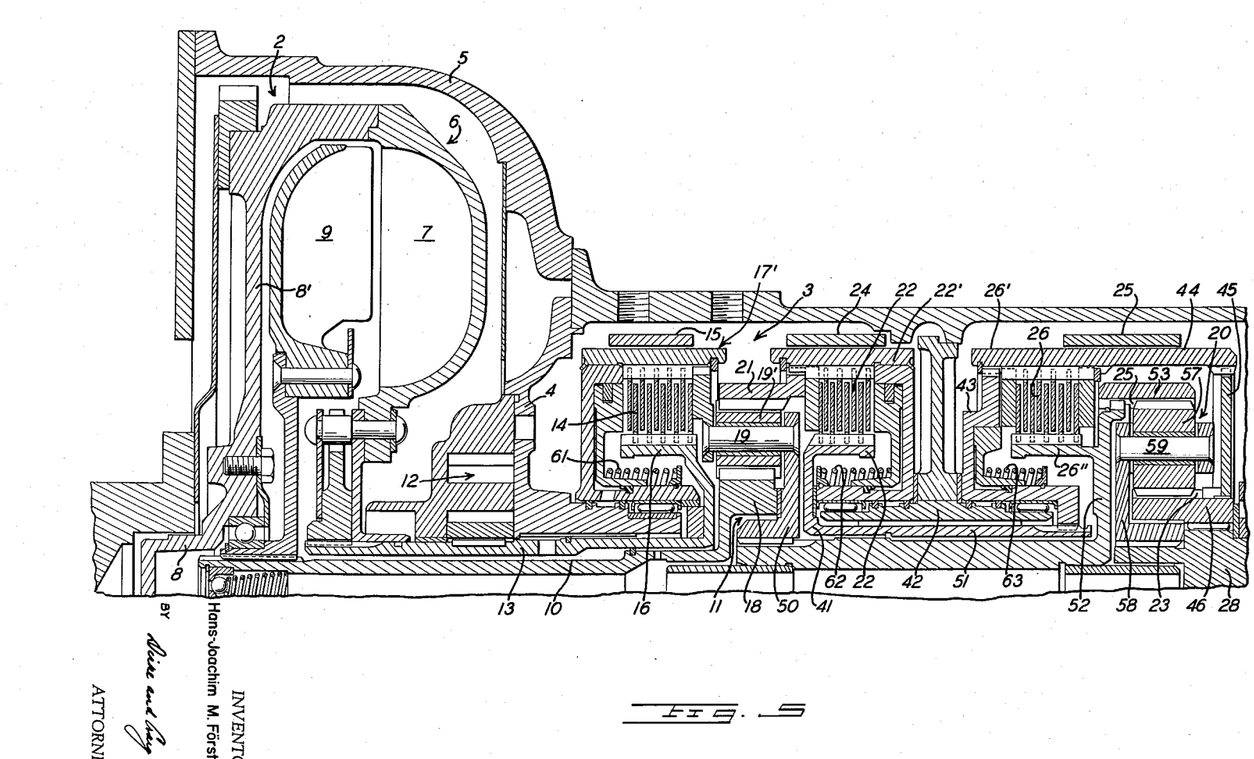
Figure 5 is a partial cross-sectional view through the actual construction of a transmission according to Figure 4 with certain parts thereof omitted for clarity's sake.

One constructional detail of a transmission unit shown in Figure 4 in which corresponding parts have been designated by corresponding elements is shown in Figure 5 in which the details of the clutch 26 and of the second planetary gear set as well as of the gear pump 29 have been omitted since they may be similar to those of the clutches 14 or 22 and of the gear set 11 as well as of pump 12. The clutches 14, 22 as well as the clutch 26 not illustrated in Figure 5 may thereby be hydraulically controlled by means of a piston member as is conventional which is spring loaded and which may be hydraulically actuated against the spring force by means of oil supplied by either or both of the gear pumps 12 and 29 through appropriate ports, bores and grooves provided in the transmission.

In motor vehicles, in which comfort is desired and in which the degree of efficiency is of no particular concern, the transmission of Figure 4 may also be modified to include an additional clutch or clutches such as clutch 34 and/or clutch 32 as illustrated in Figure 3.

While I have shown and described several embodiments in accordance with the present invention, it is understood that the same is not limited thereto but is susceptible of many changes within the spirit of the present invention, such as the substitution of a different type of hydrodynamic device for the hydrodynamic coupling 6 shown herein, for example, a torque converter, or the substitution of different types of mechanical change speed gears for the planetary gear sets 11 and 20, for example, counter shaft change speed transmissions or combined planetary and counter shaft transmissions with any number of speeds, provided they perform the same basic function as indicated hereinabove in that the by-pass clutch for the hydrodynamic device thereof is located within the compartment or section of the transmission accommodating the mechanical transmission unit and also serves possibly as gear-shifting clutch. Consequently, I do not intend that the foregoing description of the several embodiments be construed as limitative of my invention but solely for purposes of illustration, and I intend to cover any and all such modifications within the spirit of the present invention as are encompassed by the appended claims.

I claim:

1. A change speed transmission comprising a hydrodynamic unit including a hydrodynamic device having a driving member and a driven member, a mechanical change speed gear unit operatively connected with said hydrodynamic unit, said gear unit including two gear sets each essentially consisting of a plurality of meshing rotatable elements, engageable by-pass clutch means connected between said driving member and one of said rotatable elements of one of said gear sets of said mechanical change speed gear unit for effectively by-passing said hydrodynamic device, said last-mentioned one element of said one gear set serving as torque transmitting input transmitting essentially all the torque from said driving member to said other gear set over said one gear set with said clutch means engaged one of the rotatable elements of the other of said gear sets being connected with said driven member for common rotation therewith at all times, said engageable by-pass clutch means being located spatially separated from said hydrodynamic unit within said mechanical unit, means operatively connecting one of the rotatable elements of the other gear set with a rotatable element of said one gear set other than the rotatable element thereof with which said driven member is connected, and output means operatively connected with another rotatable element of said other gear set.

2. A change speed transmission according to claim 1, wherein said mechanical change speed gear unit includes a planetary gear set at the input thereof and wherein said hydrodynamic device is a fluid coupling.

3. A change speed transmission according to claim 2, wherein said by-pass clutch means is a hydraulically actuated friction-disk type clutch.

4. A change speed transmission, especially for motor vehicles, comprising a transmission housing having means to subdivide said housing into a hydrodynamic section and a mechanical section, input means, a hydrodynamic coupling having a driving member connected with said input means and a driven member, said hydrodynamic coupling being located within said hydrodynamic section of said housing, mechanical change speed gear means located within said mechanical section including at least one planetary gear set having a plurality of rotatable elements consisting of two central gears, planet gear means meshing with said central gears, and planet carrier means for said planet gear means, means connecting said driven member of said hydrodynamic coupling with only one of said central gears of said change speed gear means to provide rotation in unison therewith, and engageable by-pass clutch means operatively connected directly between said input means and at least one of two rotatable elements consisting of said one central gear and said planet carrier means of said change speed gear means for effectively by-passing said hydrodynamic coupling, said engageable by-pass clutch means being located in said mechanical section of said transmission housing spatially separated from said hydrodynamic coupling.

5. A change speed transmission according to claim 4, wherein said means to subdivide said housing includes a cover, and further comprising an oil pump operatively connected with said input means and located at said cover on the side thereof facing said hydrodynamic coupling.

6. A change speed transmission according to claim 5, wherein said by-pass clutch means is arranged axially between the first gear set of said mechanical change speed gear means and between the cover constituted by said subdividing means which closes off said mechanical change speed gear means against said hydrodynamic coupling.

7. A change speed transmission according to claim 4, further comprising brake means for said planetary gear set, and wherein said by-pass clutch means is located axially within said brake means.

8. A change speed transmission according to claim 4, wherein said mechanical change speed gear means includes a two-step planetary gear and wherein said by-pass clutch means simultaneously serves for effectively locking one of the planetary gear sets.

9. A change speed transmission according to claim 4, wherein said one central gear of said planetary gear set is a sun gear, and wherein said driven member of said hydrodynamic coupling is connected with said sun gear over a hollow intermediate shaft.

10. A change speed transmission, especially for motor vehicles, comprising a transmission housing having means to subdivide said housing into a hydrodynamic section and a mechanical section, input means, a hydrodynamic coupling having a driving member connected with said input means and a driven member, said hydrodynamic coupling being located within said hydrodynamic section of said housing, mechanical change speed gear means located within said mechanical section including at least one planetary gear set having a plurality of rotatable elements consisting of two central gears, planet gear means meshing with said central gears, and planet carrier means for said planet gear means, one of said central gears being a sun gear, means connecting said driven member of said hydrodynamic coupling with said sun gear to provide rotation in unison therewith, and engageable by-pass clutch means operatively connected between said driving member and said sun gear for effectively by-passing said hydrodynamic coupling, said engageable by-pass clutch means being located in said mechanical section of said transmission housing spatially separated from said hydrodynamic coupling.

11. A change speed transmission according to claim 4, wherein said one central gear of said planetary gear set is a sun gear, and wherein one part of said by-pass clutch means is connected with said driving member and the other part thereof with said planet carrier means.

12. A change speed transmission, especially for motor vehicles, comprising a transmission housing having means to subdivide said housing into a hydrodynamic section and a mechanical section, input means, a hydrodynamic coupling having a driving member connected with said input means and a driven member, said hydrodynamic coupling being located within said hydrodynamic section of said housing, mechanical change speed gear means located within said mechanical section including at least one planetary gear set having a plurality of rotatable elements consisting of two central gears, planet gear means meshing with said central gears, and planet carrier means for said planet gear means, means connecting said driven member of said hydrodynamic coupling with one of said central gears of said change speed gear means to provide rotation in unison therewith, engageable by-pass clutch means operatively connected between said input means and one of two rotatable elements consisting of said one central gear and said planet carrier means of said change speed gear means for effectively by-passing said hydrodynamic coupling, said engageable by-pass clutch means being located in said mechanical section of said transmission housing spatially separated from said hydrodynamic coupling, and selectively engageable means for connecting one part of said by-pass clutch means with said driving member and with said one central gear.

13. A change speed transmission according to claim 4, wherein said by-pass clutch means is an automatically actuatable friction clutch.

14. A change speed transmission according to claim 4, wherein said by-pass clutch means is an arbitrarily actuatable friction clutch controlled by oil pressure.

15. A change speed transmission, especially for motor vehicles, comprising a transmission housing having means to subdivide said housing into a hydrodynamic section and mechanical section, input means, a hydrodynamic coupling having a driving member connected with said input means and a driven member, said hydrodynamic coupling being located within said hydrodynamic section of said housing, mechanical change speed gear means located within said mechanical section including two planetary gear sets each essentially consisting of a plurality of meshing rotatable elements including a sun gear, a ring gear and a planet carrier supporting thereon a planet gear in meshing engagement with a respective sun and ring gear, means operatively connecting said driven member of said hydrodynamic coupling with the sun gear of the first planetary gear set of said change speed gear means to provide rotation in unison therewith, means for selectively connecting the ring gear of the first planetary gear set with the sun gear of the second planetary gear set, and engageable by-pass clutch means operatively connected between said input means and one of two rotatable elements consisting of said sun gear and said planet carrier of the first planetary gear set for effectively by-passing said hydrodynamic coupling, said engageable by-pass clutch means being located in said mechanical section of said transmission housing spatially separated from said hydrodynamic coupling.

16. A change speed transmission, especially for motor vehicles, comprising a transmission housing having means to subdivide said housing into a hydrodynamic section and into a mechanical section, input means, a hydrodynamic coupling having a driving member connected with said input means and a driven member, said hydrodynamic coupling being located within said hydrodynamic section of said housing, mechanical change speed gear means located within said mechanical section including two planetary gear sets each having a sun gear, a ring gear and a planet carrier supporting thereon a planet gear in meshing engagement with a respective sun and ring gear, means for selectively connecting the ring gear of said first planetary gear set with the sun gear of said second planetary gear set, the planet carrier of said first planetary gear set being connected with the ring gear of the second planetary gear set, means connecting said driven member of said hydrodynamic coupling with said change speed gear means, and engageable by-pass clutch means operatively connected between said input means and said change speed gear means for effectively by-passing said hydrodynamic coupling, said engageable by-pass clutch means being located in said mechanical section of said transmission housing spatially separated from said hydrodynamic coupling.

17. A change speed transmission according to claim 16, further comprising output means connected with the planet carrier of said second planetary gear set.

18. A change speed transmission according to claim 17, further comprising an oil pump driven by said output means.

19. A change speed transmission according to claim 4, further comprising a hollow shaft for connecting said driving member with said by-pass clutch means simultaneously forming the drive shaft of an oil pump located in said hydrodynamic section.

20. A change speed transmission, especially for motor vehicles, consisting of a hydrodynamic unit adapted to be selectively and completely by-passed in at least one speed other than direct drive, and including a fluid coupling having a driving member and a driven member and of a mechanical change speed gear operatively connected behind said hydrodynamic unit and including two planetary gear sets, each of said planetary gear sets having a plurality of rotatable elements including planet gear means and planet carrier means for said planet gear means, a mechanical by-pass clutch operatively connected between said driving member of said fluid coupling and one of said rotatable elements of the one planetary gear set for effectively by-passing said fluid coupling and thereby render the same ineffectual for the transmission of any torque, said driven member being directly connected with one of the rotatable elements of the other of said planetary gear sets, said mechanical by-pass clutch being located spatially separated from said fluid coupling within said mechanical change speed gear and simultaneously serving for locking the first planetary gear set, and means drivingly connecting said other planetary gear set with said planet carrier means of said one planetary gear set.

21. A change speed transmission, especially for motor vehicles, consisting of a hydrodynamic unit adapted to be by-passed and including a fluid coupling having a driving member and a driven member and of a mechanical change speed gear operatively connected behind said hydrodynamic unit and including two planetary gear sets, each planetary gear set including a sun gear, a ring gear and a planet carrier supporting thereon a planet gear in meshing engagement with a respective ring and sun gear, means for disengageably connecting the ring gear of said first planetary gear set with the sun gear of said second planetary gear set, means disengageably connecting the ring and sun gear of said second planetary gear set with each other, means connecting the planet carrier of said first planetary gear set with the ring gear of said second planetary gear set, said driven member being directly connected with the sun gear of said first planetary gear set, a mechanical by-pass clutch operatively connected between said driving member of said fluid coupling and one of said rotatable elements of said planetary gear set, said mechanical by-pass clutch being located spatially separated from said fluid coupling within said mechanical change speed gear and simultaneously serving for locking the first planetary gear set.

22. A change speed transmission according to claim 21, further comprising brake means for the sun gear of one of said planetary gear sets and the ring gear of the other of said planetary gear sets.

23. A change speed transmission according to claim 22, further comprising clutch means selectively connecting said by-pass clutch with the input to said hydrodynamic coupling and with the sun gear of said first planetary gear set.

References Cited in the file of this patent

UNITED STATES PATENTS

| | | |
|---|---|---|
| 2,211,233 | Kelley | Apr. 13, 1940 |
| 2,381,772 | Pentz | Aug. 7, 1945 |
| 2,749,773 | Simpson | June 12, 1956 |
| 2,749,777 | Simpson | June 12, 1956 |
| 2,803,974 | Kelley | Aug. 27, 1957 |